(12) United States Patent
Åström et al.

(10) Patent No.: US 9,866,471 B2
(45) Date of Patent: Jan. 9, 2018

(54) PATH SETUP IN A MESH NETWORK (71) Applicant: Telefonaktiebolaget L M Ericsson (publ), Stockholm (SE)

(72) Inventors: Magnus Åström, Lund (SE); Rocco Di Taranto, Lund (SE); Dzevdan Kapetanovic, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 179 days.

(21) Appl. No.: 14/763,297

(22) PCT Filed: Jun. 17, 2015

(86) PCT No.: PCT/EP2015/063600
§ 371 (c)(1),
(2) Date: Jul. 24, 2015

(87) PCT Pub. No.: WO2016/202381
PCT Pub. Date: Dec. 22, 2016

(65) Prior Publication Data
US 2017/0142004 A1   May 18, 2017

(51) Int. Cl.
| | |
|---|---|
| H04L 12/721 | (2013.01) |
| H04W 24/10 | (2009.01) |
| H04L 12/26 | (2006.01) |
| H04B 7/14 | (2006.01) |
| H04W 84/18 | (2009.01) |

(52) U.S. Cl.
CPC ............ H04L 45/26 (2013.01); H04B 7/14 (2013.01); H04L 43/08 (2013.01); H04L 45/34 (2013.01); H04W 24/10 (2013.01); H04W 84/18 (2013.01)

(58) Field of Classification Search
None
See application file for complete search history.

(56) References Cited

U.S. PATENT DOCUMENTS

| | | | |
|---|---|---|---|
| 5,646,936 A * | 7/1997 | Shah | G06F 11/2007 340/2.7 |
| 2003/0202468 A1 | 10/2003 | Cain et al. | |
| 2003/0204625 A1 | 10/2003 | Cain | |

(Continued)

FOREIGN PATENT DOCUMENTS

| | | | |
|---|---|---|---|
| GB | 2411549 A * | 8/2005 | ............ H04L 12/28 |
| GB | 2411549 A | 8/2005 | |

(Continued)

OTHER PUBLICATIONS

Singh, M., et al., "Cluster-Based Routing Scheme for Wireless Mesh Networks", 13th International Conference on Advanced Communication Technology (ICACT), Feb. 13, 2011, pp. 335-338, IEEE.

*Primary Examiner* — Charles C. Jiang
*Assistant Examiner* — George Atkins, Jr.
(74) *Attorney, Agent, or Firm* — Coats & Bennett, PLLC (57) ABSTRACT

A path of relay nodes is set up in a mesh network (100) between a source node (102) and a destination node (104). During a phase of handling path request, PREQ, messages a cluster table is maintained in a node (123) and during a phase of handling path reply, PREP, messages this cluster table is utilized to establish node clusters (120) that comprise nodes that can relay subsequent messages between the source node (102) and the destination node (104).

24 Claims, 4 Drawing Sheets

(56) References Cited

U.S. PATENT DOCUMENTS

| | | | |
|---|---|---|---|
| 2004/0233847 A1* | 11/2004 | Park | H04L 45/00 370/235 |
| 2004/0233882 A1* | 11/2004 | Park | H04L 45/00 370/338 |
| 2005/0036486 A1 | 2/2005 | Sahinoglu et al. | |
| 2007/0121521 A1 | 5/2007 | D'Amico et al. | |
| 2008/0039101 A1* | 2/2008 | Callaway | H04L 45/26 455/445 |
| 2008/0247355 A1 | 10/2008 | Ahn | |
| 2008/0310340 A1 | 12/2008 | Isozu | |
| 2008/0317047 A1* | 12/2008 | Zeng | H04L 45/00 370/401 |
| 2009/0228575 A1 | 9/2009 | Thubert et al. | |
| 2010/0091770 A1 | 4/2010 | Ishikawa | |
| 2010/0226342 A1* | 9/2010 | Colling | H04W 56/002 370/336 |
| 2011/0128918 A1* | 6/2011 | Zhai | H04L 45/125 370/328 |
| 2011/0149858 A1* | 6/2011 | Hwang | H04W 40/26 370/328 |
| 2013/0094398 A1* | 4/2013 | Das | H04W 12/00 370/254 |
| 2014/0369359 A1* | 12/2014 | Kondo | H04W 40/28 370/400 |
| 2015/0023214 A1* | 1/2015 | Soneda | H04W 40/32 370/254 |
| 2016/0094444 A1 | 3/2016 | MeLampy et al. | |

FOREIGN PATENT DOCUMENTS

| | | |
|---|---|---|
| WO | 2010013154 A1 | 2/2010 |
| WO | 2016202380 A1 | 12/2016 |

\* cited by examiner

PATH SETUP IN A MESH NETWORK

TECHNICAL FIELD

Embodiments herein relate to a method in a relay node in a wireless communication network for handling path setup between a source node and a destination node.

BACKGROUND

Wireless communication systems that provide communication services to wireless communication devices have evolved during the last decade to meet the ever increasing demand for capabilities related to high speed data transfer and to provide these capabilities at any given time and at any geographical location. In order to provide the services at any time and place, the wireless networks typically comprise one or more network nodes, such as radio base stations, that maintain one or more radio cells and the wireless communication devices communicate via these network nodes.

However, in some scenarios wireless networks suffer from the problems of having a limited range and unreliable communications such that data is sometimes received corrupted at the receiver end. As a means to mitigate such range limitations, so-called mesh networks have been developed in which intermediary relay nodes relay data from a source node to a destination node and hence extends the range of the nodes in the mesh network. In other words, in a mesh network wireless communication devices may operate as relay nodes and communicate directly with each other without involvement from a radio base station.

Connectivity of a mesh network describes the ratio with which network nodes can reach another node in the mesh network. In the case of a fully connected mesh network all nodes are able to reach all other nodes. Often, for example in machine type communication, MTC, involving sensors or meters, communication in the mesh network is performed towards a single recipient which is a server receiving sensor or metering data. As a consequence, the only relevant connection on an applications level for a node in such a mesh network is with the server receiving its data. In this case the network is fully connected if all nodes can communicate with the server. For such a mesh network, a proactive routing technique, in which paths are maintained by periodic signaling, is highly suitable since only one route needs to be maintained for all nodes. Hence, if a node is able to find another node connected to the server it may itself connect to the server through that node. Alternatively, for more arbitrarily chosen destination nodes, a reactive network may be more suitable. In such a case a path is set up when a communication need arises, and the link dies sometime after the communication has ceased.

Path setup in a mesh network is well known in the art. For example, in the Institute of Electrical and Electronics Engineers, IEEE, standard 802.11™-2012, a source node broadcasts a Path Request, PREQ, message (or simply PREQ) in order to establish a route from itself to a destination node. The PREQ essentially contains the addresses of the source, transmitter, and destination nodes, as well as a path metric representing the cost of the path up until the present node. The PREQ is relayed by all nodes receiving it correctly until it reaches the destination node. For each node in the path, the path metric is incremented with the link cost of the most recent link. For example, in IEEE, 802.11 Mesh, the most commonly used path metric is the Air Time Link metric, ATLM, that is a representation of the transmission time required for a model message being relayed from the source node, S, to the destination node, D. A node may receive multiple PREQs for the same S and D pair, in which case it selects the PREQ with the lowest metric, having already added the metric of the link to the node itself, hence representing the lowest cost of transmission up until the present node. The node then forwards the PREQ by rebroadcasting it. Should the node already have forwarded a PREQ and then receives another PREQ it only forwards the PREQ should the metric be lower than the previous metric.

Upon receiving the PREQ, the destination node answers with a unicast Path Reply, PREP, message (or simply PREP) to its closest relay node. The PREP is then forwarded along the relay nodes until it reaches the source node and the path is established. The source node then transmits data in messages to the first node in the list of relay nodes.

The address part of the mesh message header consists of four address fields: addresses of the source node, transmitter node, receiver node and destination node, respectively. It may be further extended in the case the message originates from or is destined to outside the mesh network.

Irrespective of whether the mesh network is reactive or proactive, a path is set up between the source and destination nodes within the mesh network. In order for a message to be transmitted from a source node to destination node, an intermediary node only needs to know the final recipient. From that information the node is able to look up the node next in line, i.e., which node to relay the message to for it to eventually reach the destination.

Paths in mesh networks are often set up in order to minimize a path metric, e.g., Airtime Link Metric, ATLM, in order to establish an optimal path. Such a metric often takes into account the use of sparse radio resources but not the processing time required for each node to forward a message or, in a worst case, to ask for a retransmission of a message. Neither does such a metric consider the dynamics of wireless communications which are very volatile such that only a small change in the environment may cause a large difference in channel characteristics. What at one time is the best path according to some metric may not be best at another time. For example, a relay node that is unable to receive a message at one point in time may be able to receive a message at another point in time due to the fact that mesh networks may be dynamic in the sense that individual nodes may move within a mesh network. A node that for some reason falls outside its mesh network is detached and hence unable to communicate.

Hence there is a need to consider the dynamics of the different links in a mesh network and thereby enable a minimization of the latency of the message transmission from a source node to a destination node.

SUMMARY

In view of the above, an object of the present disclosure is to overcome or at least mitigate at least some of the drawbacks related to prior art path setup in a mesh network.

This is achieved in one aspect by a method in a relay node in a mesh network for setting up a path of relay nodes between a source node and a destination node. The method comprises reception of a plurality of broadcasted path request, PREQ, messages. The received PREQ messages are processed and the processing comprises maintaining a cluster table in the relay node. The cluster table comprises information that defines a cluster, and the cluster identifies a cluster transmitter node and a list of cluster receiver nodes that describes a path from the cluster transmitter node to the relay node via the cluster receiver nodes. A PREP message is then received and processed. The processing of the received PREP message comprises an analysis of the received PREP message and, based on an outcome of the analysis, a modified PREP message is created based on the received PREP message. The modified PREP message is then transmitted.

That is, by maintaining such a cluster table during a PREQ phase and utilizing the cluster table in the PREP phase, an effect of the method is that clusters of potential relay nodes, i.e. subsets of nodes in the mesh network, are set up to establish a path from the source node to the destination node. In subsequent message relaying from source node to destination node, an advantage is obtained in that multiple nodes, i.e. the cluster receiver nodes in one or more clusters, are allowed to receive a message, which will reduce latency. Moreover, a drawback can be avoided where one link is broken, e.g. due to fading, which in turn would cause retransmissions from the same transmitter node with a consequence of the message not being forwarded at all.

Embodiments include those where the maintaining of the cluster table in the relay node comprises replacing at least one of the cluster receiver nodes with a relay node identified in a received PREQ message.

In some embodiments the maintaining of the cluster table in the relay node comprises replacing the cluster transmitter node with a transmitter node identified in a received PREQ message.

Embodiments include those where the reception of the plurality of PREQ messages comprises any of reception of a respective PREQ message from a respective node, and reception of at least two PREQ messages from one node.

With regard to the received PREP message, it may comprise information that identifies at least one cluster that identifies a cluster transmitter node and a list of cluster receiver nodes, a cluster receiver address for use by the relay node in subsequent message relaying, and a timer value for use by the relay node in subsequent message relaying.

In some embodiments, the creation of the modified PREP message comprises adding a timer value associated with the relay node to each respective timer value of the at least one cluster identified in the received PREP message. The timer value associated with the relay node may be any of a predetermined link latency value that is known to the relay node, and a processing delay for the relay node.

Embodiments include those where the analysis of the PREP message comprises determining whether or not the cluster transmitter of a cluster in the received PREP message is equal to the relay node itself and, if the cluster transmitter of a cluster in the received PREP message is equal to the relay node itself, then the creation of the modified PREP message comprises deleting the information in the received PREP message that defines the cluster having the cluster transmitter equal to the relay node itself.

Embodiments include those where the analysis of the PREP message comprises determining whether or not a cluster receiver node of a cluster in the received PREP message is equal to the relay node itself and, if a cluster receiver node of a cluster in the received PREP message is equal to the relay node itself, then the creation of the modified PREP message comprises deleting the information in the received PREP message that defines the relay node as part of the cluster in which the relay node was identified.

In some embodiments, the analysis of the PREP message comprises determining whether or not the cluster transmitter node in the cluster table in the relay node is equal to a cluster transmitter node identified in the received PREP message and, if the cluster transmitter node in the cluster table in the relay node is not equal to a cluster transmitter node identified in the received PREP message, then creating the modified PREP message and transmitting the modified PREP message.

In some embodiments, the creation of the modified PREP message comprises providing the modified PREP message with the cluster information from the received PREP message, providing the modified PREP message with information from the cluster table in the relay node, that identifies a cluster transmitter node and cluster receiver nodes, a cluster receiver address representing said information from the cluster table in the relay node and the timer value associated with the relay node.

Another aspect of the present disclosure is a relay node for use in a mesh network for setting up a path of relay nodes between a source node and a destination node. The relay node comprises radio frequency control circuitry, a processor and a memory. The memory contains instructions executable by the processor whereby the relay node is operative to:

receive a plurality of broadcasted path request, PREQ, messages, process the received PREQ messages, comprising maintaining a cluster table in the relay node that comprises information that defines a cluster, said cluster identifying a cluster transmitter node and a list of cluster receiver nodes that describes a path from the cluster transmitter node to the relay node via the cluster receiver nodes, receive a PREP message, process the received PREP message, comprising an analysis of the received PREP message, create, based on an outcome of the analysis, a modified PREP message, said modified PREP message being based on the received PREP message, and transmit the modified PREP message.

In another aspect there is provided a computer program comprising instructions which, when executed on at least one processor in a network node, cause the network node to carry out the method according to the aspect summarized above.

In another aspect there is provided a carrier comprising a computer program according to the summarized aspect above, wherein the carrier is one of an electronic signal, an optical signal, a radio signal and a computer readable storage medium.

These other aspects provide the same effects and advantages as the method aspect summarized above.

DETAILED DESCRIPTION

Figure 1A:
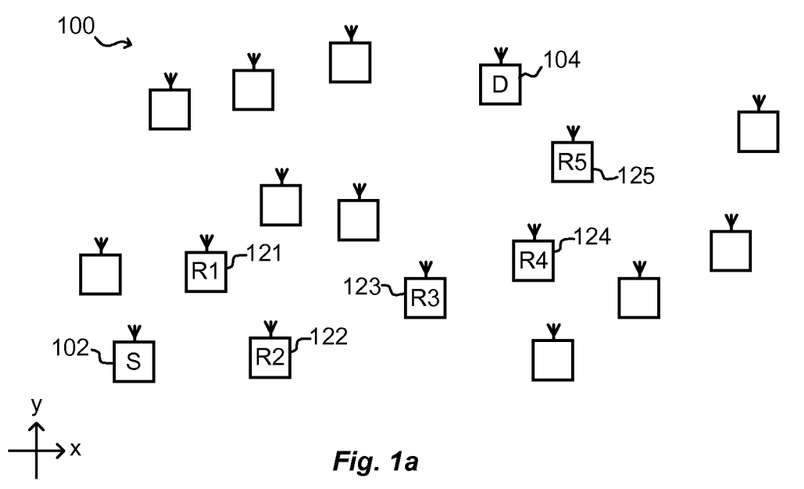
FIGS. 1a and 1b schematically illustrate nodes in a mesh network.

FIG. 1a shows a mesh network 100 that comprises a number of nodes. A source node 102, a destination node 104 and a plurality of nodes, some of which are denoted with reference numerals 121, 122, 123, 124, 125. As the skilled person will appreciate, all nodes may be of one type or of different types of wireless communication devices and the nodes may be configured to operate, e.g. communicate with each other, according to a standard such as IEEE 802.11-2012 and also operate to realize the embodiments that will be described in the following.

As will be exemplified in some detail below, setting up a path for subsequent relaying of messages between the source node 102 and the destination node 104 may involve several of the nodes in the mesh network 100. However, it is to be noted that such relaying may in some instances involve one subset of nodes and in other instances involve another subset of nodes. The actual subset, or subsets, of nodes involved in the setup will depend on the radio environment where the mesh network exists.

In the following, reference will be made to the nodes S, R1, R2, R3, R4, R5 and D that are illustrated in FIG. 1a by respective reference numerals 102, 121, 122, 123, 124, 125, and 104, respectively. In other words, when reference is made to R3, for example, it is to be understood that reference is made to the node having reference numeral 123.

Figure 1B:
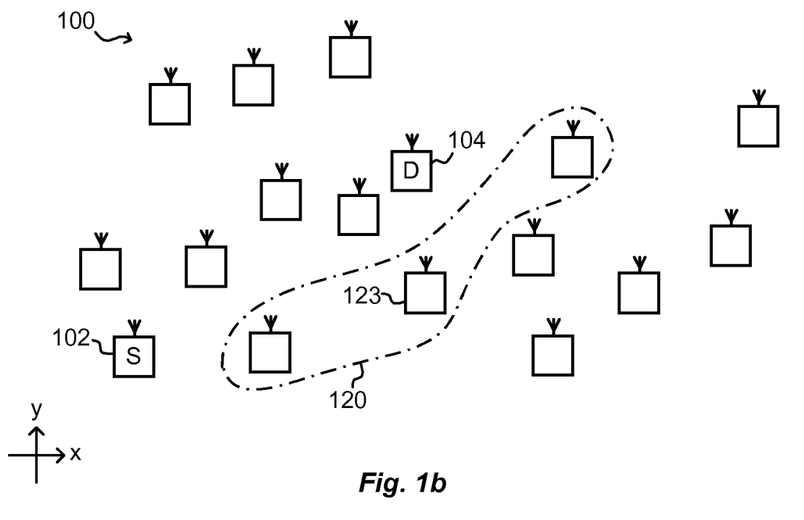

FIG. 1b schematically illustrates a node subset 120 comprising nodes such as node 123 that have been grouped into a cluster. The process of creating such clusters or subsets will be described in the following and illustrated by flowcharts in FIGS. 2 and 3.

Figure 2:
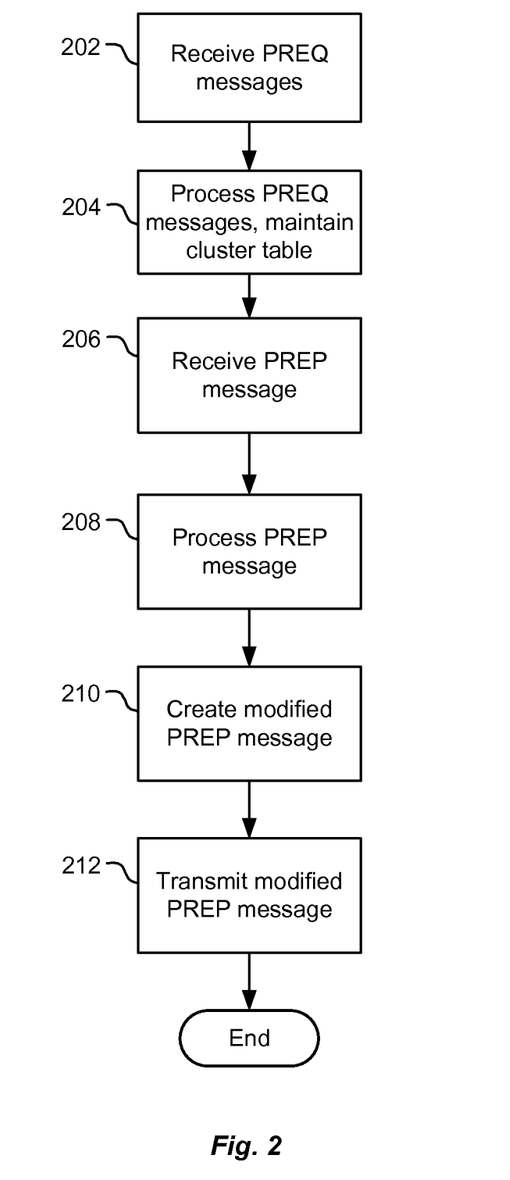
FIG. 2 is a flowchart of a method in a relay node.

Turning now to FIG. 2, and with continued reference to FIG. 1a, embodiments of a method in the node 123 in the mesh network 100 for setting up a path between the source node 102 and the destination node 104 will be described in terms of a number of actions. As will be illustrated below in connection with embodiments of a relay node and a computer program, the actions of the method in FIG. 2 may be realized by way of software executed by a processor in the relay node 123.

For the purpose of the description of these embodiments, the node 123 is denoted the relay node 123. However, as mentioned above, it shall be remembered that "relay node" is to be interpreted as a functional role that any of the nodes in the mesh network 100 may take, depending on how a path between the source and destination nodes has been setup.

Action 202

The relay node 123 receives a plurality of broadcasted PREQ messages. The PREQ messages may have been transmitted by broadcasting by any node in the mesh network 100, including the source node 102 and any of the nodes 121, 122, 124 and 125.

For example, the reception of the plurality of PREQ messages may comprise reception of a respective PREQ message from a respective node and also, e.g., reception of at least two PREQ messages from one node.

Action 204

The received PREQ messages are processed. The processing comprises maintaining a cluster table in the relay node 123 that comprises information that defines a cluster. The cluster identifies a cluster transmitter node and a list of cluster receiver nodes that describes a path from the cluster transmitter node to the relay node 123 via the cluster receiver nodes.

The cluster table in the relay node 123 may be maintained such that an accumulated path metric is minimized for the path from the cluster transmitter node to the relay node 123 via the cluster receiver nodes.

For example, at least one of the cluster receiver nodes in the cluster table may be replaced with a relay node identified in a received PREQ message. For example, the cluster transmitter node in the cluster table may be replaced with a transmitter node identified in a received PREQ message.

Action 206

Having received and processed the PREQ messages, the relay node 123 receives a PREP message. Due to the fact that PREP messages are unicast messages, the PREP message received in this action 206 is received from one other node in the mesh network, for example any one of nodes 121, 122, 124, 125 or the destination node 104.

The received PREP message may comprise information that identifies at least one cluster. Such a cluster then identifies a cluster transmitter node and a list of cluster receiver nodes, a cluster receiver address for use by the relay node 123 in subsequent message relaying, and a timer value for use by the relay node 123 in subsequent message relaying.

Action 208

The received PREP message is processed and the processing comprises an analysis of the received PREP message.

Action 210

Based on an outcome of the analysis in action 208, a modified PREP message is created, the modified PREP message being based on the received PREP message.

For example, the creation of the modified PREP message may comprise adding a timer value associated with the relay node 123 to each respective timer value of the at least one cluster identified in the received PREP message.

As mentioned, the timer value associated with the relay node 123 may be any of a predetermined link latency value that is known to the relay node 123, and a processing delay for the relay node.

For example, the analysis of the PREP message may comprise determining whether or not the cluster transmitter of a cluster in the received PREP message is equal to the relay node 123 itself. If the cluster transmitter of a cluster in the received PREP message is equal to the relay node 123 itself, then the creation of the modified PREP message comprises deleting the information in the received PREP message that defines the cluster having the cluster transmitter equal to the relay node 123 itself.

In some examples, the analysis of the PREP message may comprise determining whether or not a cluster receiver node of a cluster in the received PREP message is equal to the relay node 123 itself. In such examples, if a cluster receiver node of a cluster in the received PREP message is equal to the relay node 123 itself, then the creation of the modified PREP message comprises deleting the information in the received PREP message that defines the relay node 123 as part of the cluster in which the relay node 123 was identified.

In some examples, the analysis of the PREP message may comprise determining whether or not the cluster transmitter node in the cluster table in the relay node 123 is equal to a cluster transmitter node identified in the received PREP message. In such examples, if the cluster transmitter node in the cluster table in the relay node 123 is not equal to a cluster transmitter node identified in the received PREP message, then creating the modified PREP message, and transmitting the modified PREP message.

In some examples, the creation of the modified PREP message may comprise providing the modified PREP message with the cluster information from the received PREP message, providing the modified PREP message with information from the cluster table in the relay node 123, that identifies a cluster transmitter node and cluster receiver nodes, a cluster receiver address representing the information from the cluster table in the relay node 123 and a timer value associated with the relay node 123.

Action 212

The modified PREP message is then transmitted. As mentioned, the PREP message is a unicast message and it is therefore transmitted to one other node in the mesh network 100, for example any one of nodes 121,122,124,125 or the source node 102.

Figure 3:
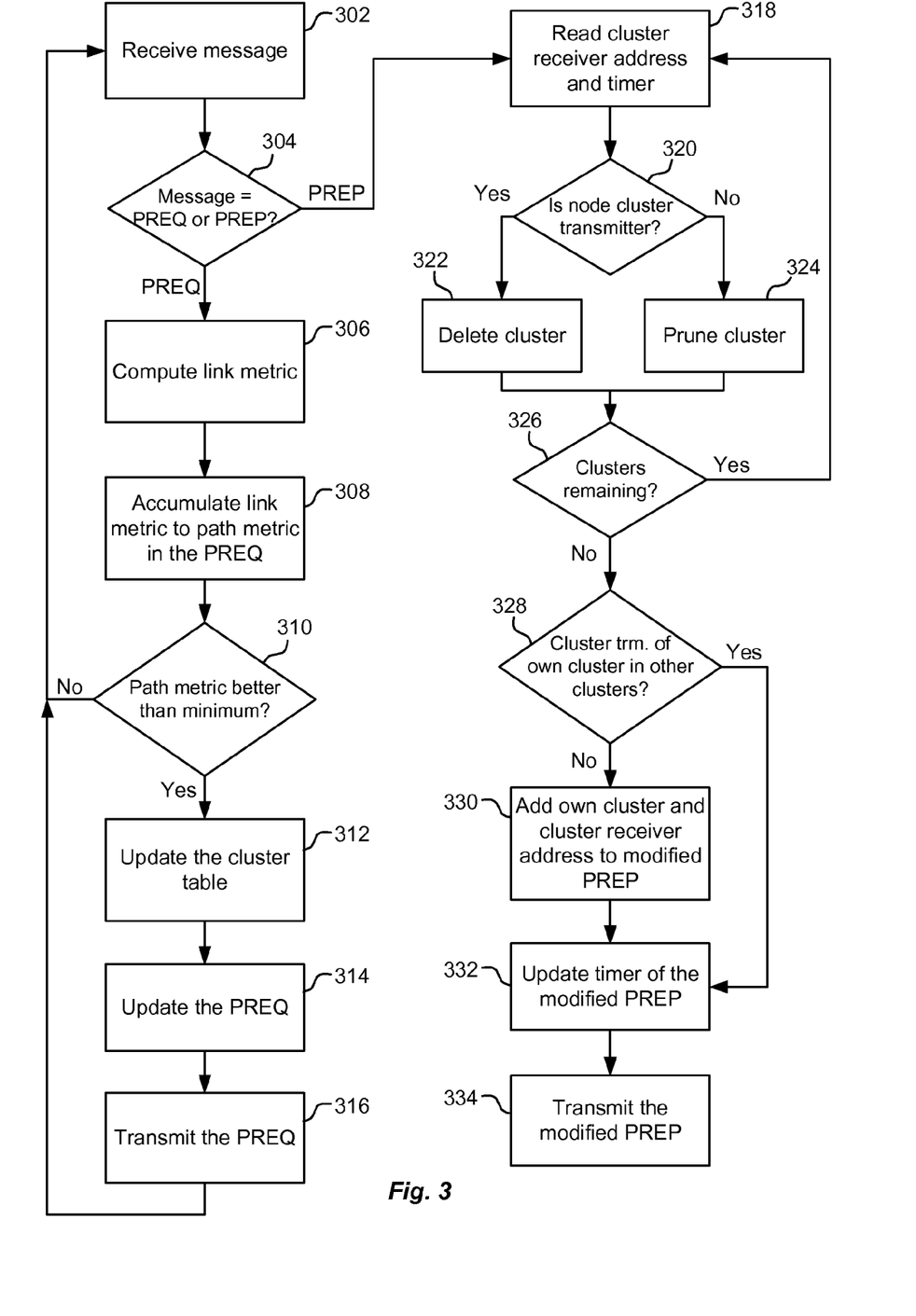
FIG. 3 is a flowchart of a method in a relay node.

Turning now to FIG. 3, more detailed examples of actions involved in a path setup method will be described. Similar to the example described above in connection with FIG. 2 continued reference will be made to FIG. 1 a. Also, the actions of the method in FIG. 3 may be realized by way of software executed by a processor in the relay node 123.

For the purpose of the description of the embodiments illustrated by FIG. 3, the node 123 is denoted the relay node 123 or simply R3. However, as mentioned above, it shall be remembered that "the relay node" is to be interpreted as a functional role that any of the nodes in the mesh network 100 may take, depending on how a path between the source and destination nodes has been setup. Moreover, for the sake of making the description clear and to illustrate effects and advantages of the examples, references will be made to actions performed by other nodes, such as the nodes S, R1, R2, R4, R5 and D when interacting with each other. In other words, all actions described and illustrated in FIG. 3 may be performed by each single node when interacting with other nodes during path setup.

The actions in FIG. 3 illustrate embodiments of a path setup procedure that consists of a PREQ signalling phase, illustrated by actions 306-316 that are to be understood as being embodiments of the actions 202 and 204 described above, and a PREP signalling phase, illustrated by actions 318-334 that are to be understood as being embodiments of the actions 206 to 212 described above.

Action 302

R3 receives a message and determines what type of message it is.

Action 304

A selection is made, depending on what type of message was received in action 302. In case the received message is a PREQ message, the PREQ phase commences with action 306 and, in case the received message is a PREP message, the PREP phase commences with action 318.

In this example, it is determined that it is a PREQ message received directly from S at a first time instant. This PREQ contains the following fields, where the abbreviation PM stands for a path metric. (As the skilled person will realize, a PREQ message may comprise other fields not illustrated here.)

| PREQ from S: | | | | |
|---|---|---|---|---|
| Source | Destination | Transmitter | Previous Relays | PM |
| S | D | S | | 0 |

Actions 306, 308 and 310

R3 accumulates a link metric value from S to R3, denoted as $X\_S$ in the following, to the path metric in the PREQ from S. In this case the PREQ PM is zero since S is the first link in the path, which results in a PM at R3 that equals $X\_S+0=X\_S$. Since this is the first received PREQ, this PM is also the minimum PM, PM_min.

If the received PREQ is not the first received PREQ, the check in action 310 whether the PREQ PM is better, i.e. less, than PM_min, may find that the PREQ PM is not better than PM_min and then return execution of the method to action 302 and processing of further PREQ messages. If, on the other hand the check in action 310 finds that the PREQ PM is better than PM_min, execution continues with updating the cluster table and the PREQ message in actions 312 to 316.

After actions 302-310 have been executed a first time, R3 will locally store a cluster table with the following information.

| Cluster table at R3: | | | | |
|---|---|---|---|---|
| Source | Destination | Cluster transmitter node | Cluster receiver nodes | PM_min |
| S | D | S | | $X\_S$ |

In this cluster table in R3, the "Source" field will always contain the original source of messages that are to be transmitted via the path that is to be setup. The "Destination" field contains an intended final receiver of the messages. These fields will enable R3 to separate different clusters for different paths (i.e. other source-destination pairs) from each other. However, as the skilled person will realize, for the purpose of simplifying the description, it is necessary to illustrate only one path setup between one source and one destination.

The "Cluster transmitter" field will contain the transmitter of the best PREQ observed so far at R3, as will be explained in more detail below. The "Cluster receiver nodes" field contains all intermediary relays from the cluster transmitter node to R3.

The updating of these fields will be clear by continuing with receiving and processing a second and further PREQ messages at subsequent time instants.

At a second time instant a PREQ is received from R2 (i.e. actions 302 and 304). The PREQ from R2 has the same source S and the PREQ from R2 hence comprises, i.a., the following information.

| PREQ from R2: | | | | |
|---|---|---|---|---|
| Source | Destination | Transmitter | Previous Relays | PM |
| S | D | R2 | S | $X\_2$ |

In action 306 in R3 the link metric from R2 to R3 is computed, denoted as X23, and action 308 accumulates this link metric to the PM in the PREQ from R2: $PM\_R2=X\_2+X23$.

Now R3 decides (i.e. action 310) which of the paths is the preferred path: the path described by the cluster in its current cluster table or the new path described by the transmitter and previous relays in the PREQ from R2. This is done by comparing the new PM_R2 with PM_min. If PM_R2< PM_min, then the cluster table in R3 will be updated in action 312 to the following.

Cluster table at R3:

| Source | Destination | Cluster transmitter node | Cluster receiver nodes | PM_min |
|---|---|---|---|---|
| S | D | S | R2 | PM_R2 |

Actions 312, 314 and 316

After updating the cluster table in action 312, the PREQ is updated and transmitted in actions 314 and 316. The PREQ update comprises altering the transmitter address and updating the path metric based on the data in the cluster table. Transmission, i.e. broadcasting, of the updated PREQ message then takes place in action 316.

(Note that, if the check in action 310 finds that PM_R2>PM_min, then the old cluster table is kept and execution returns to action 302.)

At a third time instant, actions 302 and 304 are once again repeated and R3 receives a PREQ from R1 with the same source S. Assume this PREQ from R1 looks as follows.

PREQ from R1:

| Source | Destination | Transmitter | Previous Relays | PM |
|---|---|---|---|---|
| S | D | R1 | S | X_1 |

Also here R3 computes, in action 306, a link metric from R1 to R3, denoted X13, and accumulates, in action 308, it to the PM in the PREQ from R1: PM_R1=X_1+X13. R3 then compares, in action 310, this path metric with PM_min in its current cluster table and depending on the outcome it either updates its PM_min or not. If PM_R1<PM_min, then the "Cluster receiver nodes" field in R3's cluster table is updated in action 312 to R1 instead and PM_min is updated to PM_R1. If PM_R1>PM_min, then no update is necessary. We assume the latter case, so that the previous cluster table at R3 is not changed.

At a fourth time instant, actions 302 and 304 are once again repeated and R3 receives yet another PREQ from R2, this time with a lower PM than R2's previous PREQ. Assume this PREQ looks as follows.

PREQ from R2

| Source | Destination | Transmitter | Previous Relays | PM |
|---|---|---|---|---|
| S | D | R2 | R1 | X_2 |

Again, R3 computes the link metric, in action 306, from R2 to R3, denoted X23, and accumulates, in action 308, it to the PM of the new PREQ from R2: PM_R2=X_2+X23. If PM_R2 is smaller than PM_min, as checked in action 310, then the cluster field will be updated, in action 312, to the following.

Cluster table in R3

| Source | Destination | Cluster transmitter node | Cluster receiver nodes | PM_min |
|---|---|---|---|---|
| S | D | S | R2, R1 | PM_R2 |

Hence, the "Cluster transmitter node" field in the cluster table in R3 is maintained since S is the farthest node that R3 has received from. Moreover, the "Cluster receiver nodes" field is now updated to nodes between the cluster transmitter node and R3, and in this case it is R2 and R1.

After updating the cluster table in action 312, the PREQ is updated and transmitted in actions 314 and 316 as mentioned above.

Consider now the situation at node R4, and assume that R4 does not hear the PREQ from S, but it hears the PREQ from R1 with the content as illustrated above. This would be similar to a situation where the PREQ sent by S to R4 has a link metric that is above a preset threshold. This would mean that the received PREQ is very unreliable, and thus no data should be sent directly from S to R4. Now, since the PREQ from R1 lists S as a previous relay, but R4 could not "hear" the PREQ from S, R4 will not specify S as its cluster transmitter. Instead, it will specify R1 as its cluster transmitter, and the "Cluster receiver nodes" field in the cluster table in R4 will be empty as illustrated below.

Cluster table at R4:

| Source | Destination | Cluster transmitter node | Cluster receiver nodes | PM_min |
|---|---|---|---|---|
| S | D | R1 |  | X_1 + X14 |

Here, as explained above, X14 is the link metric from R1 to R4, which is accumulated, at execution of action 308 in R4, to the PM in the PREQ from R1.

The above described procedure is repeated for every node in the path that so far has been defined (i.e. as defined by the information in a current cluster table). Note that the PREQ sent from a node can be easily created from the cluster table at that node. Namely, the "Transmitter" field in the PREQ is always the identity of the transmitting node, while the "Previous Relays" field is obtained by concatenating the "Cluster transmitter node" field from the left with the "Cluster receiver nodes" field. Concatenation by left means that if {A} is concatenated from left with {C,D}, the result is {A,C,D}. Note that proper concatenation from the left is necessary, since the ordering in which the relays appear is crucial for the path setup.

A variation of the updating procedure described above is such that the comparisons in action 310 are slightly altered such that additional relay nodes are promoted in relation to fewer relay nodes. The comparison in action 310 would then look like PM_min<PM_R2+Δn where Δ represents an extra metric cost that is accepted with each additional node, and here computed for an additional n nodes.

In the end every node, including the destination node D, will have a cluster table that describes the optimal path from a certain cluster transmitter node to that node (the "Cluster receiver nodes" field), along with the cost of that path (given by the PM_min field). The cluster table at a certain node indicates that a message sent from the cluster transmitter node or any of the relays can be reliably received at that node (moreover, it is the most efficient path from the cluster transmitter node to that node). Additionally, it also means that any of the relays can properly receive a message sent from the cluster transmitter node. As an example, the final cluster table at R3 above indicates that R3 can properly receive a message from R1 and R2, while R2 can properly receive a message from R1 (since it included it in its PREQ).

Continuing now with the PREP signaling phase of actions 318-334 in FIG. 3.

At the end of the PREQ signaling phase, we assume that the destination node D has the following cluster table.

| | | Cluster table at D: | | |
|---|---|---|---|---|
| Source | Destination | Cluster transmitter node | Cluster receiver nodes | PM_min |
| S | D | R3 | R4, R5 | X_D |

From this cluster table, it is inferred that a message sent from R3, R4 or R5 can be received correctly at D. Moreover, it is also inferred that a message from R3 is properly received at R4 and R5.

Now, at the commencement of the PREP signaling phase, D wants to inform its cluster transmitter node about this situation. Hence, from the cluster table, D constructs the following PREP message addressed only to R5 (as the skilled person will realize, the PREP may contain additional fields not illustrated here). The PREP message comprises information about a cluster to which D belongs, i.e. this cluster is defined by the information in the cluster table in D.

In addition to the cluster table information (i.e. cluster transmitter and cluster receiver nodes), D also adds a timer information, which may have a value related to processing delay in D. However, in case D is a cluster receiver node, the timer should actually be zero since D will never relay the message anyway since it is the final destination. Hence, in such a case there is no need to add a delay. Moreover, since D is the node appending the cluster in the PREP message, adding a cluster receiver address which is a common receiver address for all nodes in the cluster, as mentioned above in connection with FIG. 2. As will be described in more detail below, the timer information will be of use in subsequent message relaying when the path between S and D has been setup by this procedure.

| | | | PREP from D: | | | |
|---|---|---|---|---|---|---|
| Source | Destination | Transmitter | Cluster receiver address | Cluster transmitter node | Cluster receiver nodes | Timer |
| D | S | D | R5 | R3 | R4, R5, D | 0 |

Action 302 and 304

This PREP message constructed by D is then transmitted to R5 and R5 performs actions 302 and 304 and determines that the message is a PREP message and consequently, executes action 318.

Action 318

In action 318, R5 reads the "Cluster transmitter node" field in the clusters of the PREP received from D.

Actions 320 to 324

A check is then made in action 320 and, if R5, in action 320, finds itself defined as the cluster transmitter node of the processed cluster of the received PREP message, then R5 removes the cluster in action 322.

On the other hand, in action 320, if R5 finds that it is not defined as the cluster transmitter node of the processed cluster of the received PREP message, then R5 may prune the cluster, e.g. by removing, in action 324, itself from the cluster receiver nodes field.

Action 326

This process, i.e. actions 318 to 324, is repeated for all clusters in the received PREP message, as illustrated by the checking, in action 326, whether any clusters remain in the received PREP message.

Action 328

Next, R5 compares the cluster transmitter nodes of any of the clusters in the received PREP message to the cluster transmitter of its own cluster table.

Action 330

If all cluster transmitter nodes of the received PREP message differ from the cluster transmitter node of R5, R5 adds its own cluster to a modified PREP message, otherwise not. The modified PREP message may, hence, comprise information that defines one or more clusters. Moreover, similar to the initial PREP message created by D, a cluster receiver address that identifies the added cluster is added to the modified PREP message. This cluster receiver address is a common receiver address for all nodes in the cluster, as mentioned above in connection with FIG. 2.

Action 332

Then R5 updates the timer information in all clusters in the modified PREP message by adding its own timer value to the existing timer value of each cluster. The incremented timer value may either be a fixed value common for the whole mesh network and known to each node in the mesh network, or a timer value that is based on a processing delay of the node itself. For example, the timer value may be an estimate of the processing delay in the node and the estimate of the propagation delay to the node that is closest to it in the specific cluster in the received PREP message.

Action 334

Finally, R5 forwards the modified PREP to the next node in the path, R4 and this procedure is repeated for each node along the path. Once a node receives a PREP message (which, as mentioned above, may contain several clusters from other nodes) and sees that it is the cluster transmitter node for some cluster in the received PREP message, it will remove that specific cluster when creating the modified PREP message.

Moreover, messages from that node are addressed to the cluster receiver address that was defined by the node adding the cluster to the PREP.

At the end, S will receive an appended (i.e. modified) PREP message, and apply the same procedure as described above. Hence, S will end up with its own cluster receiver address, meaning that all future messages from S to D should be assigned the cluster receiver address as receiver address, and no other address. This means that all nodes belonging to a certain cluster will handle a message from S addressed to the corresponding cluster receiver address, and apply an individual timing mechanism for relaying this message to other nodes on the path. Hence, this cluster receiver address approach differs from the conventional mesh communication, where messages from S to D are always addressed to the single succeeding relay node in the path. Referring back to FIG. 1*b*, the cluster receiver address is an address to which all the nodes in the cluster or subset 120 will listen and hence receive subsequent messages at. It is to be noted that the details regarding the application, i.e. use, of the timer in future message relaying is outside the scope of the present disclosure.

Figure 4:
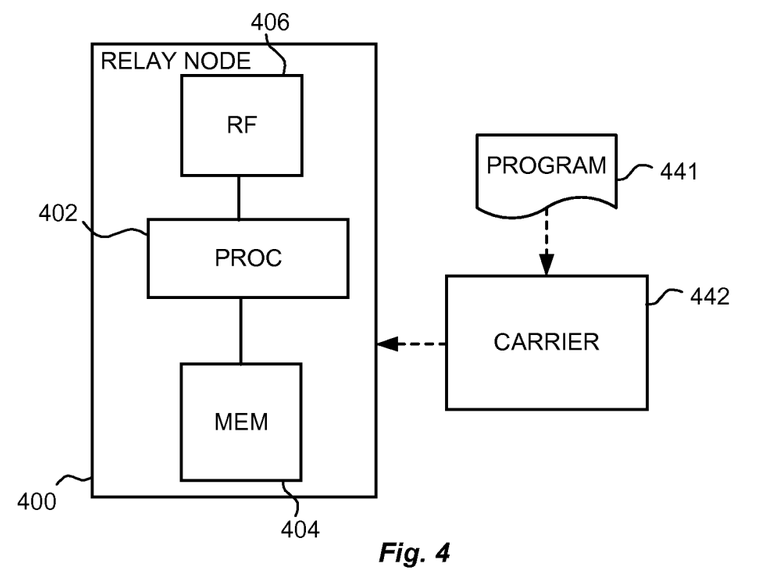
FIG. 4 schematically illustrates a block diagram of a relay node.

Turning now to FIG. 4, a relay node 400 will be described in some more detail. For example, the relay node 400 may be any of the nodes 121,122,123,124,125 discussed above in connection with FIGS. 1 to 3. The relay node 400 is for use in a mesh network 100 for setting up a path of relay nodes between a source node 102 and a destination node 104. The relay node 400 comprises radio frequency control circuitry 406, a processor 402 and a memory 404. The memory 404 contains instructions executable by the processor 402 whereby the relay node 400 is operative to:

receive a plurality of broadcasted path request, PREQ, messages, process the received PREQ messages, comprising maintaining a cluster table in the relay node that comprises information that defines a cluster, said cluster identifying a cluster transmitter node and a list of cluster receiver nodes that describes a path from the cluster transmitter node to the relay node via the cluster receiver nodes, receive a PREP message, process the received PREP message, comprising an analysis of the received PREP message, create, based on an outcome of the analysis, a modified PREP message, said modified PREP message being based on the received PREP message, and transmit the modified PREP message.

The instructions that are executable by the processor 402 may be software in the form of a computer program 441. The computer program 441 may be contained in or by a carrier 442, which may provide the computer program 441 to the memory 404 and processor 402. The carrier 442 may be in any suitable form including an electronic signal, an optical signal, a radio signal or a computer readable storage medium. 14.

In some embodiments, the relay node is operative to:
maintain the cluster table in the relay node such that an accumulated path metric is minimized for the path from the cluster transmitter node to the relay node via the cluster receiver nodes.

In some embodiments, the relay node is operative to maintain the cluster table in the relay node by:
replacing at least one of the cluster receiver nodes with a relay node identified in a received PREQ message.

In some embodiments, the relay node is operative to maintain the cluster table in the relay node by:
replacing the cluster transmitter node with a transmitter node identified in a received PREQ message.

In some embodiments, the relay node is operative such that the reception of the plurality of PREQ messages comprises any of:
reception of a respective PREQ message from a respective node, and
reception of at least two PREQ messages from one node.

In some embodiments, the relay node is operative such that the received PREP message comprises information that identifies at least one cluster, said cluster identifying:
a cluster transmitter node and a list of cluster receiver nodes,
a cluster receiver address for use by the relay node in subsequent message relaying, and
a timer value for use by the relay node in subsequent message relaying.

In some embodiments, the relay node is operative such that the creation of the modified PREP message comprises:
adding a timer value associated with the relay node to each respective timer value of the at least one cluster identified in the received PREP message.

In some embodiments, the relay node is operative such that the analysis of the PREP message comprises:
determining whether or not the cluster transmitter node of a cluster in the received PREP message is equal to the relay node itself, and
if the cluster transmitter node of a cluster in the received PREP message is equal to the relay node itself, then:
the creation of the modified PREP message comprises deleting the information in the received PREP message that defines the cluster having the cluster transmitter node equal to the relay node itself.

In some embodiments, the relay node is operative such that the analysis of the PREP message comprises:
determining whether or not a cluster receiver node of a cluster in the received PREP message is equal to the relay node itself, and
if a cluster receiver node of a cluster in the received PREP message is equal to the relay node itself, then:
the creation of the modified PREP message comprises deleting the information in the received PREP message that defines the relay node as part of the cluster in which the relay node was identified.

In some embodiments, the relay node is operative such that the analysis of the PREP message comprises:
determining whether or not the cluster transmitter node in the cluster table in the relay node is equal to a cluster transmitter node identified in the received PREP message, and
if the cluster transmitter node in the cluster table in the relay node is not equal to a cluster transmitter node identified in the received PREP message, then:
creating the modified PREP message, and
transmitting the modified PREP message.

In some embodiments, the relay node is operative such that the creation of the modified PREP message comprises:
providing the modified PREP message with the cluster information from the received PREP message,
providing the modified PREP message with information from the cluster table in the relay node, that identifies a cluster transmitter node and cluster receiver nodes, a cluster receiver address representing said information from the cluster table in the relay node and the timer value associated with the relay node.

In some embodiments, the relay node is operative such that the timer value associated with the relay node is any of:
a predetermined link latency value that is known to the relay node, and
a processing delay for the relay node.

Figure 5:
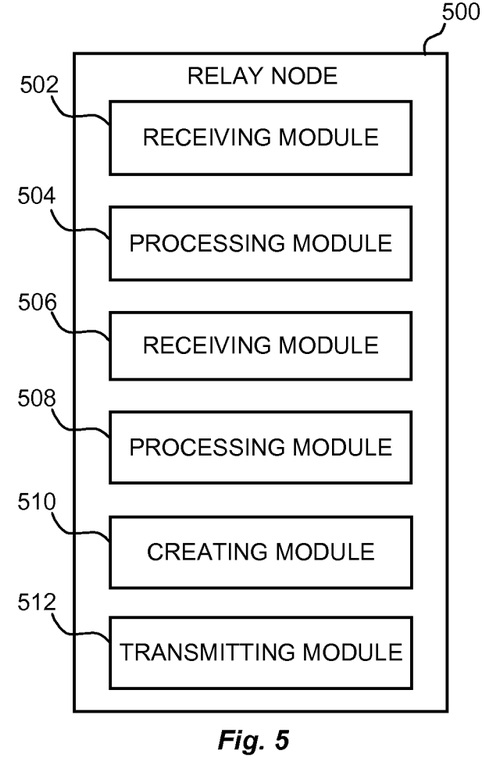
FIG. 5 schematically illustrates a block diagram of a relay node.

Turning now to FIG. 5, a relay node 500 will be described in some more detail. For example, the relay node 500 may be any of the nodes 121,122,123,124,125 discussed above in connection with FIGS. 1 to 3. The relay node 500 is for use in a mesh network 100 for setting up a path of relay nodes between a source node 102 and a destination node 104. The relay node 500 comprises:

a receiving module 502 configured to receive a plurality of broadcasted path request, PREQ, messages, a processing module 504 configured to process the received PREQ messages, comprising maintaining a cluster table in the relay node that comprises information that defines a cluster, said cluster identifying a cluster transmitter node and a list of cluster receiver nodes that describes a path from the cluster transmitter node to the relay node via the cluster receiver nodes, a receiving module 506 configured to receive a PREP message, a processing module 508 configured to process the received PREP message, comprising an analysis of the received PREP message, a creating module 510 configured to create, based on an outcome of the analysis, a modified PREP message, said modified PREP message being based on the received PREP message, and a transmitting module 512 configured to transmit the modified PREP message.

The relay node 500 may comprise further modules that are configured to perform in a similar manner as, e.g., the relay node 400 described above in connection with FIG. 4.

As used herein, the term "processing module" may refer to a processing circuit, a processing unit, a processor, an Application Specific integrated Circuit, ASIC, a Field-Programmable Gate Array, FPGA, or the like. As an example, a processor, an ASIC, an FPGA or the like may comprise one or more processor kernels. In some examples, the processing module may be embodied by a software module or hardware module. Any such module may be a determining means, estimating means, capturing means, associating means, comparing means, identification means, selecting means, receiving means, transmitting means or the like as disclosed herein. As an example, the expression "means" may be a module, such as a determining module, selecting module, etc.

As used herein, the expression "configured to" may mean that a processing circuit is configured to, or adapted to, by means of software configuration and/or hardware configuration, perform one or more of the actions described herein.

As used herein, the term "memory" may refer to a hard disk, a magnetic storage medium, a portable computer diskette or disc, flash memory, random access memory, RAM, or the like. Furthermore, the term "memory" may refer to an internal register memory of a processor or the like.

As used herein, the term "computer readable medium" may be a Universal Serial Bus, USB, memory, a DVD-disc, a Blu-ray disc, a software module that is received as a stream of data, a Flash memory, a hard drive, a memory card, such as a MemoryStick, a Multimedia Card, MMC, etc.

As used herein, the term "computer readable code units" may be text of a computer program, parts of or an entire binary file representing a computer program in a compiled format or anything there between.

As used herein, the terms "number", "value" may be any kind of digit, such as binary, real, imaginary or rational number or the like. Moreover, "number", "value" may be one or more characters, such as a letter or a string of letters. "number", "value" may also be represented by a bit string.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

The invention claimed is:

1. A method, performed in a relay node in a mesh network, for setting up a path of relay nodes between a source node and a destination node, the method comprising:
   receiving a plurality of broadcasted path request (PREQ) messages;
   processing the received PREQ messages, the processing the received PREQ messages comprising maintaining a cluster table in the relay node that comprises information that defines a cluster, the cluster identifying a cluster transmitter node and a list of cluster receiver nodes that describes a path from the cluster transmitter node to the relay node via the cluster receiver nodes;
   receiving a Path Reply (PREP) message comprising information that identifies at least one cluster, the at least one cluster identifying:
      a cluster transmitter node and a list of cluster receiver nodes;
      a cluster receiver address for use by the relay node in subsequent message relaying; and
      a timer value for use by the relay node in subsequent message relaying;
   analyzing the received PREP message to determine whether or not the cluster transmitter node of a cluster in the received PREP message is equal to the relay node itself;
   responsive to the cluster transmitter node of a cluster in the received PREP message being equal to the relay node itself, creating a modified PREP message based on the received PREP message and transmitting the modified PREP message;
   wherein creating the modified PREP message comprises:
      adding a timer value associated with the relay node to each respective timer value of the at least one cluster identified in the received PREP message;
      deleting information in the received PREP message that defines the cluster having the cluster transmitter node equal to the relay node itself.

2. The method of claim 1, wherein the maintaining the cluster table comprises maintaining the cluster table in the relay node such that an accumulated path metric is minimized for the path from the cluster transmitter node to the relay node via the cluster receiver nodes.

3. The method of claim 2, wherein the maintaining the cluster table in the relay node comprises replacing at least one of the cluster receiver nodes with a relay node identified in a received PREQ message.

4. The method of claim 2, wherein the maintaining the cluster table in the relay node comprises replacing the cluster transmitter node with a transmitter node identified in a received PREQ message.

5. The method of claim 2, wherein the reception of the plurality of PREQ messages comprises any of:
   reception of a respective PREQ message from a respective node; and
   reception of at least two PREQ messages from one node.

6. The method of claim 1, wherein the timer value associated with the relay node is any of:
   a predetermined link latency value that is known to the relay node; and
   a processing delay for the relay node.

7. A relay node for use in a mesh network for setting up a path of relay nodes between a source node and a destination node, the relay node comprising:
   radio frequency control circuitry;
   a processor; and
   memory containing instructions executable by the processor that, when executed by the processor, cause the relay node to be operative to:
      receive a plurality of broadcasted path request (PREQ) messages;
      process the received PREQ messages, the processing of the received PREQ messages comprising maintaining a cluster table in the relay node that comprises information that defines a cluster, the cluster identifying a cluster transmitter node and a list of cluster receiver nodes that describes a path from the cluster transmitter node to the relay node via the cluster receiver nodes, receive a Path Reply (PREP) message comprising information that identifies at least one cluster, the at least one cluster identifying:
a cluster transmitter node and a list of cluster receiver nodes;
a cluster receiver address for use by the relay node in subsequent message relaying; and
a timer value for use by the relay node in subsequent message relaying;
analyze the received PREP message to determine whether or not the cluster transmitter node of a cluster in the received PREP message is equal to the relay node itself;
responsive to the cluster transmitter node of a cluster in the received PREP message being equal to the relay node itself, create a modified PREP message based on the received PREP message and transmit the modified PREP message;
wherein to create the modified PREP message, the instructions further cause the relay node to be operative to:
add a timer value associated with the relay node to each respective timer value of the at least one cluster identified in the received PREP message; and
delete the information in the received PREP message that defines the cluster having the cluster transmitter node equal to the relay node itself.

8. The relay node of claim 7, wherein the instructions, when executed by the processor, cause the relay node to be operative to maintain the cluster table in the relay node such that an accumulated path metric is minimized for the path from the cluster transmitter node to the relay node via the cluster receiver nodes.

9. The relay node of claim 8, wherein the instructions, when executed by the processor, cause the relay node to be operative to maintain the cluster table in the relay node by replacing at least one of the cluster receiver nodes with a relay node identified in a received PREQ message.

10. The relay node of claim 8, wherein the instructions, when executed by the processor, cause the relay node to be operative to maintain the cluster table in the relay node by replacing the cluster transmitter node with a transmitter node identified in a received PREQ message.

11. The relay node of claim 8, wherein the instructions, when executed by the processor, cause the relay node to be operative such that the reception of the plurality of PREQ messages comprises any of:
reception of a respective PREQ message from a respective node, and
reception of at least two PREQ messages from one node.

12. The relay node of claim 7, wherein the instructions, when executed by the processor, cause the relay node to be operative such that the timer value associated with the relay node is any of:
a predetermined link latency value that is known to the relay node, and
a processing delay for the relay node.

13. A method, performed in a relay node in a mesh network, for setting up a path of relay nodes between a source node and a destination node, the method comprising:
receiving a plurality of broadcasted path request (PREQ) messages;
processing the received PREQ messages, the processing the received PREQ messages comprising maintaining a cluster table in the relay node that comprises information that defines a cluster, the cluster identifying a cluster transmitter node and a list of cluster receiver nodes that describes a path from the cluster transmitter node to the relay node via the cluster receiver nodes;
receiving a Path Reply (PREP) message comprising information that identifies at least one cluster, the at least one cluster identifying:
a cluster transmitter node and a list of cluster receiver nodes;
a cluster receiver address for use by the relay node in subsequent message relaying; and
a timer value for use by the relay node in subsequent message relaying;
analyzing the received PREP message to determine whether or not a cluster receiver node of a cluster in the received PREP message is equal to the relay node itself;
responsive to a cluster receiver node of a cluster in the received PREP message being equal to the relay node itself, creating a modified PREP message based on the received PREP message and transmitting the modified PREP message;
wherein creating the modified PREP message comprises:
adding a timer value associated with the relay node to each respective timer value of the at least one cluster identified in the received PREP message;
deleting information in the received PREP message that defines the relay node as part of the cluster in which the relay node was identified.

14. The method of claim 13, wherein maintaining the cluster table comprises maintaining the cluster table in the relay node such that an accumulated path metric is minimized for the path from the cluster transmitter node to the relay node via the cluster receiver nodes.

15. The method of claim 13, wherein the timer value associated with the relay node is any of:
a predetermined link latency value that is known to the relay node; and
a processing delay for the relay node.

16. A relay node for use in a mesh network for setting up a path of relay nodes between a source node and a destination node, the relay node comprising:
radio frequency control circuitry;
a processor; and
memory containing instructions executable by the processor that, when executed by the processor, cause the relay node to be operative to:
receive a plurality of broadcasted path request (PREQ) messages;
process the received PREQ messages, the processing of the received PREQ messages comprising maintaining a cluster table in the relay node that comprises information that defines a cluster, the cluster identifying a cluster transmitter node and a list of cluster receiver nodes that describes a path from the cluster transmitter node to the relay node via the cluster receiver nodes,
receive a Path Reply (PREP) message comprising information that identifies at least one cluster, the at least one cluster identifying:
a cluster transmitter node and a list of cluster receiver nodes;
a cluster receiver address for use by the relay node in subsequent message relaying; and
a timer value for use by the relay node in subsequent message relaying;
analyze the received PREP message to determine whether or not a cluster receiver node of a cluster in the received PREP message is equal to the relay node itself; and responsive to a cluster receiver node of a cluster in the received PREP message being equal to the relay node itself, create a modified PREP message based on the received PREP message and transmit the modified PREP message;

wherein to create the modified PREP message, the instructions further cause the relay node to be operative to:

add a timer value associated with the relay node to each respective timer value of the at least one cluster identified in the received PREP message; and delete the information in the received PREP message that defines the relay node as part of the cluster in which the relay node was identified.

17. The relay node of claim 16, wherein to maintain the cluster, the instructions further cause the relay node to be operative to maintain the cluster table in the relay node such that an accumulated path metric is minimized for the path from the cluster transmitter node to the relay node via the cluster receiver nodes.

18. The relay node of claim 16, wherein the timer value associated with the relay node is any of:

a predetermined link latency value that is known to the relay node; and a processing delay for the relay node.

19. A method, performed in a relay node in a mesh network, for setting up a path of relay nodes between a source node and a destination node, the method comprising:

receiving a plurality of broadcasted path request (PREQ) messages;

processing the received PREQ messages, the processing the received PREQ messages comprising maintaining a cluster table in the relay node that comprises information that defines a cluster, the cluster identifying a cluster transmitter node and a list of cluster receiver nodes that describes a path from the cluster transmitter node to the relay node via the cluster receiver nodes;

receiving a Path Reply (PREP) message comprising information that identifies at least one cluster that identifies:

a cluster transmitter node and a list of cluster receiver nodes;

a cluster receiver address for use by the relay node in subsequent message relaying; and a timer value for use by the relay node in subsequent message relaying;

analyzing the received PREP message to determine whether or not the cluster transmitter node in the cluster table in the relay node is equal to a cluster transmitter node identified in the received PREP message;

responsive to the cluster transmitter node in the cluster table in the relay node being not equal to a cluster transmitter node identified in the received PREP message, creating a modified PREP message based on the received PREP message and transmitting the modified PREP message;

wherein creating the modified PREP message comprises:

adding a timer value associated with the relay node to each respective timer value of the at least one cluster identified in the received PREP message;

providing the modified PREP message with:

cluster information from the received PREP message;

information, from the cluster table in the relay node, that identifies a cluster transmitter node and cluster receiver nodes, a cluster receiver address representing the information from the cluster table in the relay node, and the timer value associated with the relay node.

20. The method of claim 19, wherein maintaining the cluster table comprises maintaining the cluster table in the relay node such that an accumulated path metric is minimized for the path from the cluster transmitter node to the relay node via the cluster receiver nodes.

21. The method of claim 19, wherein the timer value associated with the relay node is any of:

a predetermined link latency value that is known to the relay node; and a processing delay for the relay node.

22. A relay node for use in a mesh network for setting up a path of relay nodes between a source node and a destination node, the relay node comprising:

radio frequency control circuitry;

a processor; and memory containing instructions executable by the processor that, when executed by the processor, cause the relay node to be operative to:

receive a plurality of broadcasted path request (PREQ) messages;

process the received PREQ messages, the processing of the received PREQ messages comprising maintaining a cluster table in the relay node that comprises information that defines a cluster, the cluster identifying a cluster transmitter node and a list of cluster receiver nodes that describes a path from the cluster transmitter node to the relay node via the cluster receiver nodes, receive a Path Reply (PREP) message comprising information that identifies at least one cluster, the at least one cluster identifying:

a cluster transmitter node and a list of cluster receiver nodes;

a cluster receiver address for use by the relay node in subsequent message relaying; and a timer value for use by the relay node in subsequent message relaying;

analyze the received PREP message to determine whether or not the cluster transmitter node in the cluster table in the relay node is equal to a cluster transmitter node identified in the received PREP message;

responsive to the cluster transmitter node in the cluster table in the relay node being not equal to a cluster transmitter node identified in the received PREP message, create a modified PREP message based on the received PREP message and transmit the modified PREP message;

wherein to create the modified PREP message, the instructions further cause the relay node to be operative to:

add a timer value associated with the relay node to each respective timer value of the at least one cluster identified in the received PREP message;

provide the modified PREP message with:

the cluster information from the received PREP message;

information, from the cluster table in the relay node, that identifies a cluster transmitter node and cluster receiver nodes, a cluster receiver address representing the information from the cluster table in the relay node and the timer value associated with the relay node.

23. The relay node of claim 22, wherein to maintain the cluster, the instructions further cause the relay node to be operative to maintain the cluster table in the relay node such that an accumulated path metric is minimized for the path from the cluster transmitter node to the relay node via the cluster receiver nodes.

24. The relay node of claim 22, wherein the timer value associated with the relay node is any of:
- a predetermined link latency value that is known to the relay node; and
- a processing delay for the relay node.

* * * * *